United States Patent
Bevly, III et al.

(10) Patent No.: US 9,420,356 B2
(45) Date of Patent: Aug. 16, 2016

(54) WIRELESS POWER-RECEIVING ASSEMBLY FOR A TELEMETRY SYSTEM IN A HIGH-TEMPERATURE ENVIRONMENT OF A COMBUSTION TURBINE ENGINE

(71) Applicants: Alex J. Bevly, III, Orlando, FL (US); Joshua S. McConkey, Orlando, FL (US)

(72) Inventors: Alex J. Bevly, III, Orlando, FL (US); Joshua S. McConkey, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 416 days.

(21) Appl. No.: 14/010,572

(22) Filed: Aug. 27, 2013

(65) Prior Publication Data

US 2015/0061893 A1  Mar. 5, 2015

(51) Int. Cl.
| | |
|---|---|
| *G08C 19/06* | (2006.01) |
| *H04Q 9/14* | (2006.01) |
| *F01D 17/02* | (2006.01) |
| *F01D 17/20* | (2006.01) |
| *F01D 21/00* | (2006.01) |

(52) U.S. Cl.
CPC .............. *H04Q 9/14* (2013.01); *F01D 17/02* (2013.01); *F01D 17/20* (2013.01); *F01D 21/003* (2013.01); *H04Q 2209/40* (2013.01); *Y02T 50/672* (2013.01)

(58) Field of Classification Search
CPC ........................................................ G08C 17/04
USPC ........................ 340/870.31, 935; 336/83, 200
See application file for complete search history.

(56) References Cited

U.S. PATENT DOCUMENTS

| | | |
|---|---|---|
| 3,876,998 A | 4/1975 | Richter et al. |
| 3,890,456 A | 6/1975 | Dils |
| 4,339,719 A | 7/1982 | Rhines et al. |
| 4,546,652 A | 10/1985 | Virkar et al. |
| 4,578,992 A | 4/1986 | Galasko et al. |
| 4,595,298 A | 6/1986 | Frederick |
| 4,703,326 A | 10/1987 | Ding et al. |
| 4,812,050 A | 3/1989 | Epstein |
| 4,851,300 A | 7/1989 | Przybyszewski |
| 4,860,442 A | 8/1989 | Ainsworth et al. |
| 4,916,715 A | 4/1990 | Adiutori |
| 4,969,956 A | 11/1990 | Kreider et al. |
| 4,970,670 A | 11/1990 | Twerdochlib |
| 4,983,034 A | 1/1991 | Spillman, Jr. |
| 5,005,353 A | 4/1991 | Acton et al. |
| 5,144,299 A | 9/1992 | Smith |
| 5,306,368 A | 4/1994 | Yamada et al. |

(Continued)

FOREIGN PATENT DOCUMENTS

GB       2424679 A    10/2006

*Primary Examiner* — Benjamin C Lee
*Assistant Examiner* — Israel Daramola

(57) ABSTRACT

In a telemetry system (100) in a high-temperature environment of a combustion turbine engine (10), a wireless power-receiving coil assembly (116) may be affixed to a movable component (104) of the turbine engine. Power-receiving coil assembly (116) may include a radio-frequency transparent housing (130) having an opening (132). A lid (134) may be provided to close the opening of the housing. Lid (134) may be positioned to provide support against a surface (120) of the movable component. An induction coil (133) is disposed in the housing distally away from the lid and encased between a first layer (136) and a last layer (140) of a potting adhesive. Lid (134) is arranged to provide vibrational buffering between the surface (120) of the movable component (104) and the layers encasing the induction coil.

15 Claims, 3 Drawing Sheets

(56) References Cited

U.S. PATENT DOCUMENTS

| | | | |
|---|---|---|---|
| 5,318,725 | A | 6/1994 | Sandhage |
| 5,416,430 | A | 5/1995 | Twerdochlib et al. |
| 5,440,300 | A | 8/1995 | Spillman, Jr. |
| 5,578,877 | A | 11/1996 | Tiemann |
| 5,583,474 | A * | 12/1996 | Mizoguchi .......... H01F 17/0006 336/200 |
| 5,952,836 | A | 9/1999 | Haake |
| 5,969,260 | A | 10/1999 | Belk et al. |
| 5,970,393 | A | 10/1999 | Khorrami et al. |
| 6,000,977 | A | 12/1999 | Haake |
| 6,034,296 | A | 3/2000 | Elvin et al. |
| 6,072,165 | A | 6/2000 | Feldman |
| 6,109,783 | A | 8/2000 | Dobler et al. |
| 6,127,040 | A | 10/2000 | Grobbauer et al. |
| 6,142,665 | A | 11/2000 | Haffner et al. |
| 6,197,424 | B1 | 3/2001 | Morrison et al. |
| 6,262,550 | B1 | 7/2001 | Kliman et al. |
| 6,280,083 | B2 | 8/2001 | Kita et al. |
| 6,331,823 | B1 | 12/2001 | El-Ibiary |
| 6,343,251 | B1 | 1/2002 | Herron et al. |
| 6,398,503 | B1 | 6/2002 | Takahashi et al. |
| 6,437,681 | B1 | 8/2002 | Wang et al. |
| 6,512,379 | B2 | 1/2003 | Harrold et al. |
| 6,523,383 | B2 | 2/2003 | Joki et al. |
| 6,532,412 | B2 | 3/2003 | Adibhatla et al. |
| 6,556,956 | B1 | 4/2003 | Hunt |
| 6,576,861 | B2 | 6/2003 | Sampath et al. |
| 6,591,182 | B1 | 7/2003 | Cece et al. |
| 6,667,725 | B1 | 12/2003 | Simons et al. |
| 6,677,683 | B2 | 1/2004 | Klausing et al. |
| 6,729,187 | B1 | 5/2004 | Gregory |
| 6,735,549 | B2 | 5/2004 | Ridolfo |
| 6,756,131 | B2 | 6/2004 | Oguma et al. |
| 6,756,908 | B2 | 6/2004 | Gass et al. |
| 6,760,689 | B2 | 7/2004 | Follin et al. |
| 6,796,187 | B2 | 9/2004 | Srinivasan et al. |
| 6,808,813 | B2 | 10/2004 | Kimura et al. |
| 6,816,817 | B1 | 11/2004 | Retlich et al. |
| 6,831,555 | B1 | 12/2004 | Miller et al. |
| 6,838,157 | B2 | 1/2005 | Subramanian |
| 6,943,699 | B2 * | 9/2005 | Ziarno .................. B64D 29/00 340/945 |
| 6,979,498 | B2 | 12/2005 | Darolia et al. |
| 6,979,991 | B2 | 12/2005 | Burns et al. |
| 7,004,622 | B2 | 2/2006 | Hardwicke et al. |
| 7,009,310 | B2 | 3/2006 | Cheung et al. |
| 7,368,827 | B2 | 5/2008 | Kulkarni et al. |
| 7,423,518 | B2 | 9/2008 | Yamada |
| 7,443,268 | B2 | 10/2008 | Tsai et al. |
| 7,572,524 | B2 | 8/2009 | Sabol et al. |
| 7,712,663 | B2 | 5/2010 | Sukegawa et al. |
| 7,868,431 | B2 | 1/2011 | Feng et al. |
| 7,932,800 | B2 | 4/2011 | Lim et al. |
| 7,969,323 | B2 | 6/2011 | Mitchell et al. |
| 8,004,423 | B2 | 8/2011 | Mitchell et al. |
| 8,023,269 | B2 | 9/2011 | Mitchell et al. |
| 8,044,757 | B2 | 10/2011 | Bae et al. |
| 8,076,587 | B2 | 12/2011 | Mitchell et al. |
| 8,092,080 | B2 | 1/2012 | Mitchell et al. |
| 8,150,348 | B2 | 4/2012 | Ho |
| 8,220,990 | B2 | 7/2012 | Mitchell et al. |
| 8,223,036 | B2 | 7/2012 | Mitchell et al. |
| 2002/0083712 | A1 | 7/2002 | Tomlinson et al. |
| 2002/0143477 | A1 | 10/2002 | Antoine et al. |
| 2003/0011458 | A1* | 1/2003 | Nuytkens ................ H01F 27/24 336/200 |
| 2003/0020480 | A1 | 1/2003 | Maylotte et al. |
| 2003/0049119 | A1 | 3/2003 | Johnson |
| 2004/0114666 | A1 | 6/2004 | Hardwicke et al. |
| 2005/0061058 | A1 | 3/2005 | Willsch et al. |
| 2006/0018361 | A1 | 1/2006 | Hardwicke et al. |
| 2006/0020415 | A1 | 1/2006 | Hardwicke et al. |
| 2009/0121896 | A1* | 5/2009 | Mitchell .................. H04Q 9/00 340/870.31 |
| 2010/0226756 | A1 | 9/2010 | Mitchell et al. |
| 2010/0226757 | A1 | 9/2010 | Mitchell et al. |
| 2011/0133950 | A1 | 6/2011 | Subramanian et al. |
| 2012/0194396 | A1 | 8/2012 | Mitchell et al. |
| 2012/0197597 | A1 | 8/2012 | Mitchell et al. |

\* cited by examiner

WIRELESS POWER-RECEIVING ASSEMBLY FOR A TELEMETRY SYSTEM IN A HIGH-TEMPERATURE ENVIRONMENT OF A COMBUSTION TURBINE ENGINE

STATEMENT REGARDING FEDERALLY SPONSORED DEVELOPMENT

Development for this invention was supported in part by Contract Number DE-FE0005666, awarded by the United States Department of Energy. Accordingly, the United States Government may have certain rights in this invention.

FIELD OF THE INVENTION

The present invention relates generally to telemetry systems in a high-temperature environment, such as that of a combustion turbine engine, and, more particularly, to a wireless power-receiving assembly for electrically powering circuitry of the telemetry system, such as may be disposed on a movable component of the turbine engine.

BACKGROUND OF THE INVENTION

Turbine engines, such as gas turbine engines, may be used in a variety of applications, such as driving an electric generator in a power generating plant or propelling a ship or an aircraft. Firing temperatures of modern gas turbine engines continue to increase in response to the demand for higher combustion efficiency.

It may be desirable to use a wireless power-receiving assembly, such as may be used for electrically powering circuitry of a telemetry system, which may be used to monitor operational parameters of the engine, such as monitoring operating temperatures of components of the turbine, e.g., a turbine blade, or monitoring thermo-mechanical stresses placed upon such components during operation of the engine. Aspects of the present invention offer improvements in connection with assemblies operating in the high-temperature, high-vibration environment of the turbine engine.

BRIEF DESCRIPTION OF THE DRAWINGS

The invention is explained in the following description in view of the drawings that show:

FIG. 4 illustrates a lid prior to being affixed onto a housing of the power-receiving assembly, and FIG. 5 illustrates the lid affixed onto the housing of the power-receiving assembly to provide vibrational buffering.

DETAILED DESCRIPTION OF THE INVENTION

Figure 1:
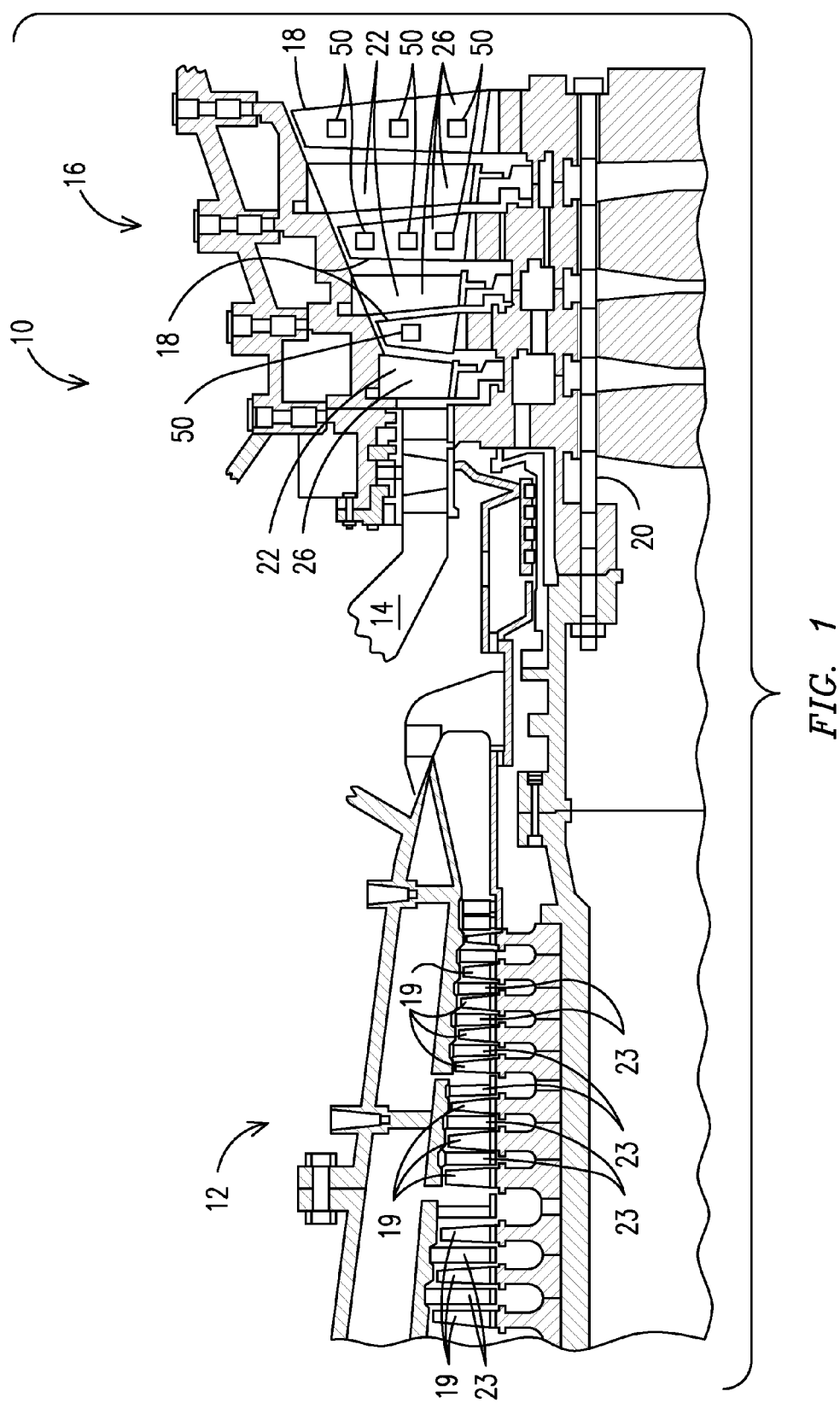
FIG. 1 is a cross sectional view of an example combustion turbine engine.

FIG. 1 illustrates an example combustion turbine engine 10, such as a gas turbine engine used for generating electricity. Disclosed embodiments of the invention may be used with combustion turbine 10 or in numerous other operating environments and for various purposes. Combustion turbine engine 10 may include a compressor 12, at least one combustor 14 (broken away) and a turbine 16. Compressor 12, combustor 14 and turbine 16 are sometimes collectively referred to as a gas or combustion turbine engine 10. Turbine 16 includes a plurality of rotating blades 18, secured to a rotatable central shaft 20. A plurality of stationary vanes 22 may be positioned between blades 18, with vanes 22 being dimensioned and configured to guide air over blades 18. Blades 18 and vanes 22 may be typically be made from nickel-based alloys, and may be coated with a thermal barrier coating ("TBC") 26, such as yttria-stabilized zirconia. Similarly, compressor 12 includes a plurality of rotating blades 19 positioned between respective vanes 23.

In operation, air is drawn in through compressor 12, where it is compressed and driven towards combustor 14. Combustor 14 mixes the air with fuel and ignites it thereby forming a working gas. This working gas temperature will typically be above about 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example, steam or compressed air, to blades 18 and vanes 22.

The environment within which turbine blades 18 and vanes 22 operate is particularly harsh, subject to high operating temperatures and a corrosive atmosphere, which may result in serious deterioration of blades 18 and vanes 22. This is especially likely if TBC 26 should spall or otherwise deteriorate. A plurality of sensors 50 may be used for detecting a condition of the blades and/or vane. Disclosed embodiments of the invention are advantageous because telemetry circuitry may transmit real time or near real time data indicative of a component's condition during operation of combustion turbine 10.

Figure 2:
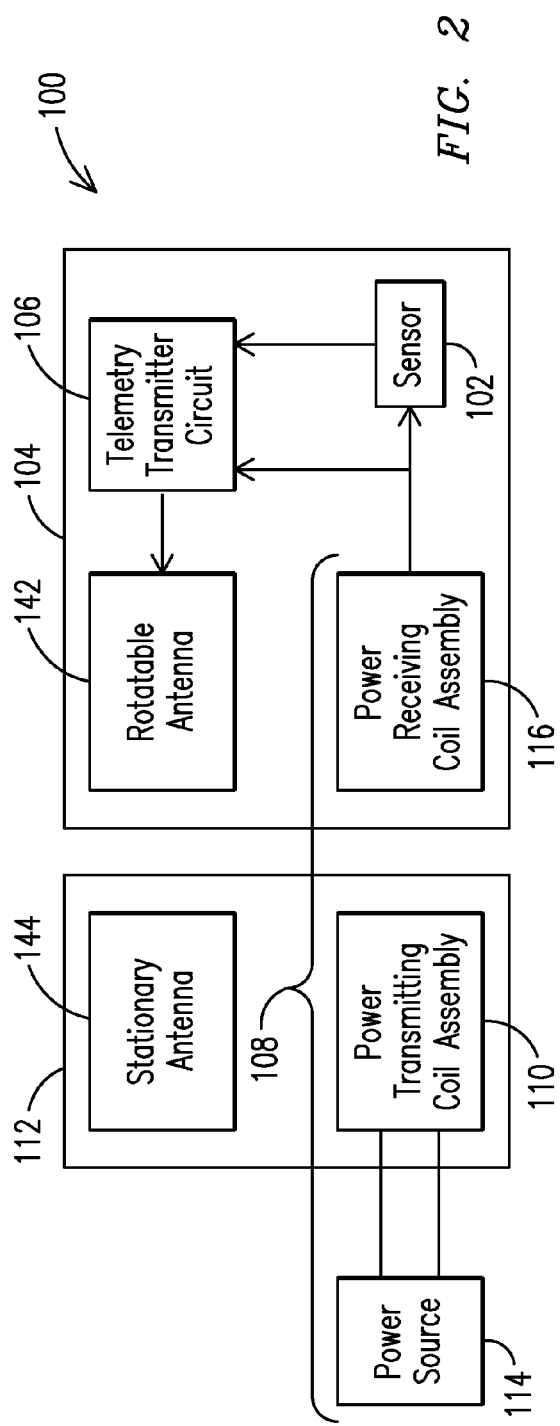
FIG. 2 is a block diagram representation of a non-limiting embodiment of a wireless telemetry system embodying aspects of the present invention.
Figure 3:
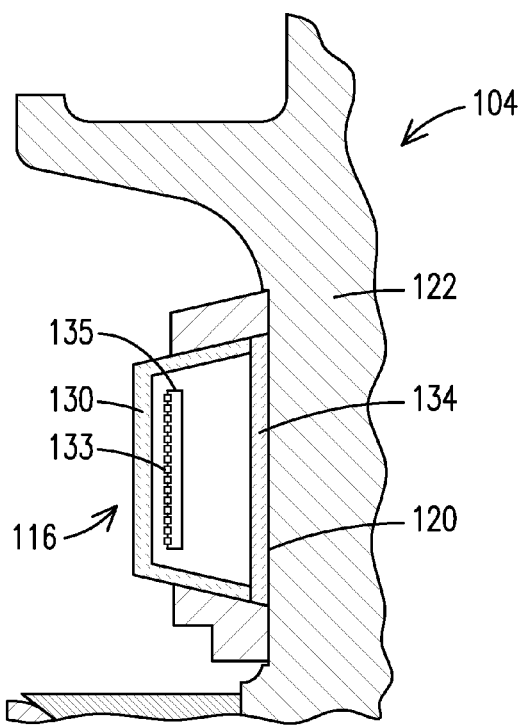
FIG. 3 is a cross-sectional view of a non-limiting embodiment of a power-receiving assembly embodying aspects of the present invention, and which may be affixed to a movable component (e.g., a rotatable blade) of the turbine engine.

FIG. 2 is a block diagram schematic representation of a non-limiting embodiment of a wireless telemetry system 100 embodying aspects of the present invention. A sensor 102 may be disposed on a movable component 104 of the turbine engine (e.g., a rotatable turbine blade). A telemetry transmitter circuit 106 may be connected to sensor 102 to receive from sensor 102 a signal indicative of a condition of movable component 104. An induction power system 108 may be arranged to wirelessly supply electrical power to circuitry on the movable component, e.g., telemetry transmitter circuit 106, sensor 102, etc. Induction power system 108 may include at least one power-transmitting coil assembly 110 affixed to a stationary component 112 of the turbine engine. Stationary component 112 may be located proximate to movable component 104. Power-transmitting coil assembly 110 may be connected to receive electrical power from a power source 114 to generate an oscillating electromagnetic field so that electrical energy may be inductively coupled in a rotatable power-receiving coil assembly 116 arranged to supply electrical power to circuitry on movable component 104. In one non-limiting embodiment, power-receiving coil assembly 116 may be affixed to an end face 120 (FIG. 3) of a root 122 of turbine blade 104.

Figure 5:
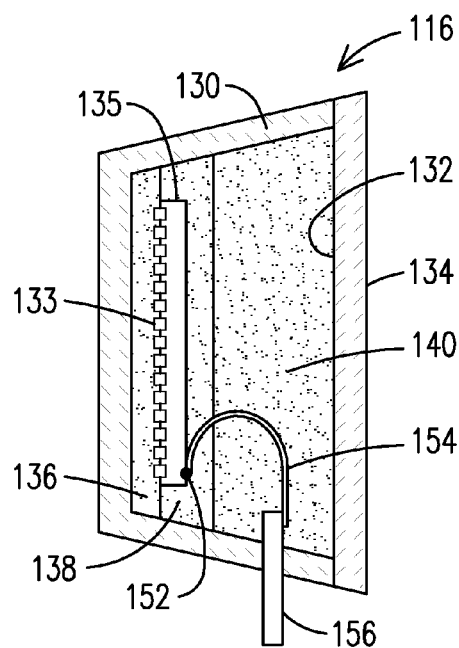
FIGS. 4 and 5 are respective cross-sectional views illustrating further details in connection with a power-receiving assembly, such as shown in FIG. 3, where
Figure 4:
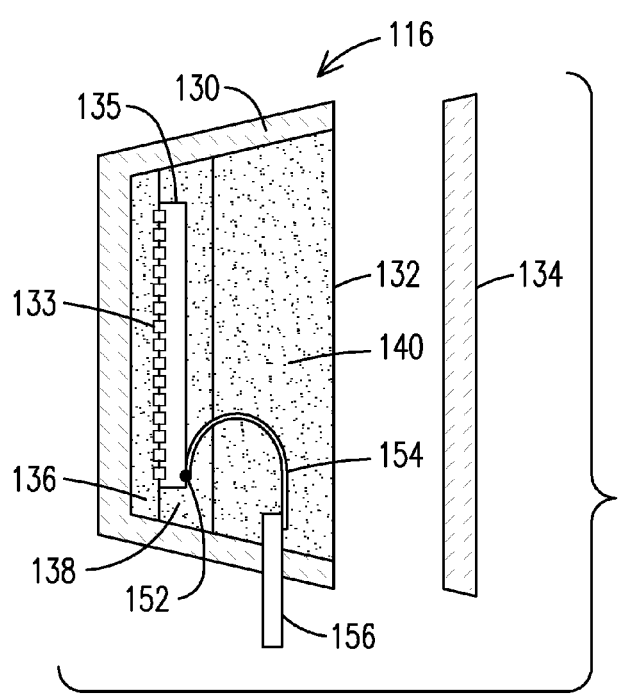

As may be appreciated in the respective cross-sectional view shown in FIG. 4, power-receiving coil assembly 116 may include a radio-frequency transparent housing 130 having an opening 132. A lid 134 is provided to close opening 132 of housing 130. FIG. 4 illustrates lid 134 prior to being affixed onto housing 130, and FIG. 5 illustrates lid 134 once it has been affixed onto housing 130 to close opening 132.

In one non-limiting embodiment, lid 134 is positioned to provide support against a surface of the movable component (e.g., end face 120 (FIG. 3) of root 122 of the turbine blade). An induction coil 133—which in one non-limiting embodiment may be constructed using printed wiring board technology in a ceramic substrate or printed wire board 135—may be disposed within the interior of housing 130 distally away from lid 134 to be encased between a plurality of layers, (e.g., layers 136, 138, 140) of a potting adhesive (e.g., encased between a first layer 136 and a last layer 140 of the potting adhesive), which in one non-limiting embodiment may be a ceramic cement.

Presuming housing 130 during assembly operations is oriented so that opening 132 is facing upwardly, first layer 136 of potting adhesive may be applied onto an interior bottom surface of housing 130 to provide a relatively thin affixing base layer to induction coil 133 embedded in ceramic substrate or board 135. In one non-limiting embodiment, first layer 136 of potting adhesive may be cured at a first temperature (e.g., room temperature) and then baked at a second temperature (e.g., approximately 500° C). A second layer 138 of potting adhesive may then be applied to encapsulate coil 133 over a relatively narrow thickness within the interior of housing 130. Upon appropriate curing and baking of second layer 138, layer 140 of potting adhesive may then be applied to, for example, practically fill-in the remaining thickness within the interior of housing 130. Upon appropriate curing and baking of layer 140 of potting adhesive, a fine bonding layer (not shown) may be applied to affix lid 134 and close opening 132 of housing 130. In one non-limiting embodiment, a coefficient of a thermal expansion of the potting adhesive may have a value between the respective values of a coefficient of thermal expansion of the ceramic material of housing 130 and a coefficient of thermal expansion of ceramic substrate or board 135, where induction coil 133 is embedded.

Lid 134 is arranged to provide vibrational buffering between the corresponding surface of the movable component (e.g., end face 120 of the root 122 of the turbine blade) and the layers (e.g., layers 136, 138, 140) encasing induction coil 133. In one non-limiting embodiment, housing 130 may be composed of a ceramic material, (e.g., to provide a relatively hard and temperature-resistant structure) and lid 134 may be composed of a ceramic matrix composite material (e.g., to provide a relatively compliant and temperature-resistant structure).

A rotatable antenna 142 (FIG. 2) may be affixed onto movable component 104 (e.g., the end face of the root of the turbine blade). Telemetry transmitter circuit 106 may be connected to rotatable antenna 142 to transmit the signal indicative of the condition of the movable component (e.g., turbine blade). A stationary data antenna 144 may be affixed onto stationary component 112 to wirelessly receive signals transmitted by telemetry transmitter circuit 106 by way of rotatable antenna 142.

Figure 6:
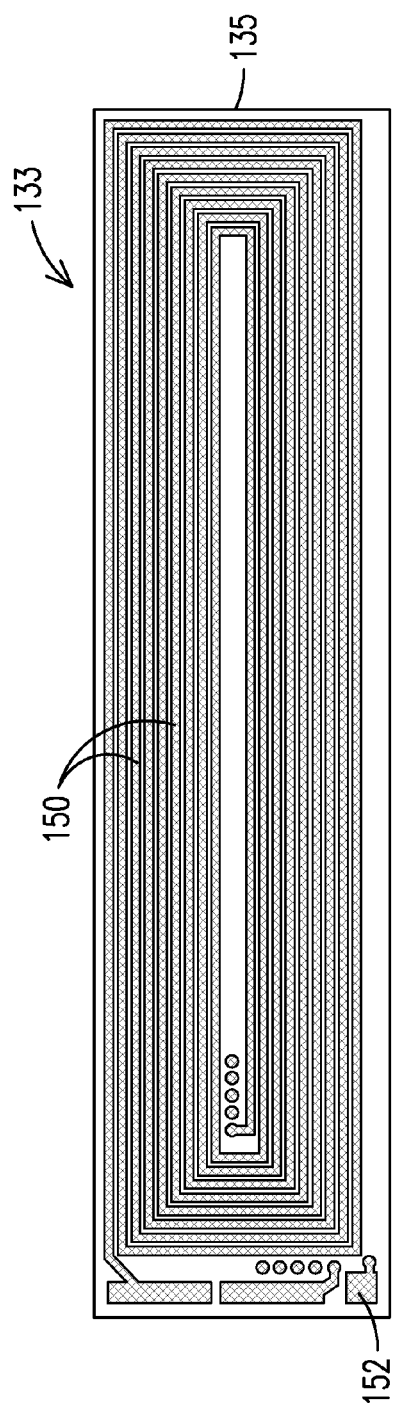
FIG. 6 is a perspective view of a schematic representation of an induction coil, which is a component of the power-receiving assembly and may be formed as a planar winding.

In one non-limiting example, as may be appreciated in FIG. 6, induction coil 133 may comprise at least one planar winding 150 embedded in ceramic substrate or board 135, which may be made of high temperature co-fired ceramic (HTCC), or a low temperature co-fired ceramic (LTCC). Traces of a conductive material, such as gold, silver, platinum and/or alloys thereof, may be used to form planar winding 150. In one non-limiting embodiment, a low-temperature co-fired ceramic tape, such as 951 Green Tape manufactured by Dupont may be used to form winding 150. The use of such metals and/or metal alloys in conjunction with LTCC can provide coils that reliably operate at temperatures up to approximately 800° C. Moreover, LTCC typically has a dielectric and insulation strength of over 1,000 volts, which enables generation of relatively more power compared to conventional induction coils. Although the structural arrangement of induction coil 133 is shown as including just a single board or substrate, it will be appreciated that such a structural arrangement could involve a stacking arrangement of a plurality of ceramic dielectric layers and a plurality of conductive layers forming a number of stacked planar windings. For readers desirous of general background information, reference is made to U.S. patent application Ser. No. (13/529,031), filed on Jun. 21, 2012, titled "A Wireless Telemetry System Including An Induction Power System", which is incorporated herein by reference.

Electrically conductive structures 152 (e.g., electrically conductive pads) may be constructed on ceramic substrate or board 135 so that, as illustrated in FIGS. 4 and 5, one or more electrical leads 154 may be soldered or brazed to one or more connectors 156 extending through housing 130. In one non-limiting embodiment, electrical leads 154 may be arranged to form a loop practically free of sharp bends (e.g., gradually curving lead) between electrically conductive structure 152 and connector 156. The loop formed by the one or more electrical leads 154 may be encased by at least one of the layers (e.g., layer 140) of the potting adhesive. This looping arrangement enhances the structural integrity for electrical connections made by way of leads 154 in the power-receiving assembly.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. In a telemetry system in a high-temperature environment of a combustion turbine engine, a wireless power-receiving coil assembly affixed to a movable component of the turbine engine comprising:
   a radio-frequency transparent housing having an opening;
   a lid to close the opening of the housing, the lid positioned to provide support against a surface of the movable component; and
   an induction coil assembly comprising a wireless power-receiving induction coil in a substrate, the induction coil assembly disposed in the housing distally away from the lid and encased between a first layer and a last layer of a potting adhesive without the induction coil assembly contacting the lid, wherein the lid is arranged to provide vibrational buffering between the surface of the movable component and the layers encasing the induction coil assembly;
   wherein the induction coil comprises at least one planar winding embedded in a ceramic substrate;
   wherein the at least one planar winding is connected to electrically power one or more circuitry of the telemetry system located on the moveable component by way of at least one or more electrical leads arranged to form a loop free of sharp bends between at least one electrically conductive structure formed on the ceramic substrate and an electrical connector extending through the housing for electrical connection to the one or more telemetry system circuitry, wherein said at least one electrically conductive structure on the ceramic substrate is electrically connected to the induction coil.

2. The power-receiving assembly of claim 1, wherein the housing is composed of a ceramic material, and the lid is composed of a ceramic matrix composite material.

3. The power-receiving assembly of claim 2, wherein a coefficient of a thermal expansion of the potting adhesive has a value between respective values of a coefficient of thermal expansion of the ceramic material and a coefficient of thermal expansion of a ceramic substrate where at least one planar winding of the induction coil is embedded.

4. The power-receiving assembly of claim 1, wherein the potting adhesive comprises a ceramic cement.

5. The power-receiving assembly of claim 1, wherein the loop formed by the one or more electrical leads is encased by at least one of the layers of the potting adhesive.

6. The power-receiving assembly of claim 1, wherein the ceramic substrate is selected from the group consisting of a high temperature co-fired ceramic, and a low temperature co-fired ceramic.

7. A telemetry system for use in a combustion turbine engine, the telemetry system comprising:
    a sensor on a turbine blade;
    a telemetry transmitter circuit connected to receive a signal from the sensor indicative of a condition of the turbine blade;
    an induction power system to power one or more circuitry of the telemetry system located on the turbine blade, the induction power system comprising:
        at least one power-transmitting coil assembly affixed to a stationary component proximate to the turbine blade; and
        a wireless power-receiving coil assembly affixed to an end face of a root of the turbine blade, the power-receiving coil assembly comprising:
            a radio-frequency transparent housing having an opening;
            a lid to close the opening of the housing, the lid positioned to provide support against the end face of the root of the turbine blade; and
            an induction coil assembly comprising a power-receiving induction coil in a substrate, the induction coil assembly disposed in the housing distally away from the lid and encased between a first layer and a last layer of a potting adhesive without the induction coil assembly contacting the lid, wherein the lid is arranged to provide vibrational buffering between the end face of the root of the turbine blade and the layers encasing the induction coil;
    a rotatable antenna affixed to the end face of the root of the turbine blade, wherein the telemetry transmitter circuit is connected to the rotatable antenna to transmit the signal indicative of the condition of the turbine blade; and
    a stationary antenna affixed to the stationary component to receive the signal indicative of the condition of the turbine blade;
    wherein the induction coil comprises at least one planar winding embedded in a ceramic substrate;
    wherein at least one planar winding is connected to electrically power one or more circuitry of the telemetry system located on the turbine blade by way of at least one or more electrical leads arranged to form a loop free of sharp bends between at least one electrically conductive structure formed on a ceramic substrate and an electrical connector extending through the housing for electrical connection to the one or more telemetry system circuitry, wherein said at least one electrically conductive structure formed on the ceramic substrate is electrically connected to the induction coil.

8. The telemetry system of claim 7, wherein the housing is composed of a ceramic material, and the lid is composed of a ceramic matrix composite material.

9. The telemetry system of claim 8, wherein a coefficient of a thermal expansion of the potting adhesive has a value between respective values of a coefficient of thermal expansion of the ceramic material and a coefficient of thermal expansion of a ceramic substrate where at least one planar winding of the secondary induction coil is embedded.

10. The telemetry system of claim 7, wherein the potting adhesive comprises a ceramic cement.

11. The power-receiving assembly of claim 7, wherein the loop formed by the one or more electrical leads is encased by at least one of the layers of the potting adhesive.

12. The power-receiving assembly of claim 7, wherein the ceramic substrate is selected from the group consisting of a high temperature co-fired ceramic, and a low temperature co-fired ceramic.

13. In a telemetry system in a high-temperature environment of a combustion turbine engine, a wireless power-receiving assembly affixed to a movable component of the turbine engine comprising:
    a radio-frequency transparent housing having an opening;
    a lid to close the opening of the housing, the lid positioned to provide support against a surface of the movable component, wherein the housing is composed of a ceramic material, and the lid is composed of a ceramic matrix composite material; and
    an induction coil assembly comprising a power-receiving induction coil in a substrate, the induction coil assembly disposed in the housing distally away from the lid and encased between a first layer and a last layer of a potting adhesive without the induction coil assembly contacting the lid, wherein the potting adhesive comprises a ceramic cement, and further wherein the lid is arranged to provide vibrational buffering between the surface of the movable component and the layers encasing the induction coil, wherein the induction coil comprises at least one planar winding embedded in a ceramic substrate;
    wherein the at least one planar winding is connected to electrically power one or more circuitry of the telemetry system located on the turbine blade by way of at least one or more electrical leads arranged to form a loop free of sharp beads between at least one electrically conductive structure formed on the ceramic substrate and an electrical connector extending through the housing for the electrical connection to the one or more telemetry system circuitry, wherein said at least one electrically conductive structure formed on the ceramic substrate is electrically connected to the induction coil, wherein the loop formed by the one or more electrical leads is encased by at least one of the layers of the potting adhesive.

14. The power-receiving assembly of claim 13, wherein the ceramic substrate is selected from the group consisting of a high temperature co-fired ceramic, and a low temperature co-fired ceramic.

15. The power-receiving assembly of claim 13, wherein a coefficient of a thermal expansion of the potting adhesive has a value between respective values of a coefficient of thermal expansion of the ceramic material and a coefficient of thermal expansion of a ceramic substrate where at least one planar winding of the induction coil is embedded.

\* \* \* \* \*